UNITED STATES PATENT OFFICE.

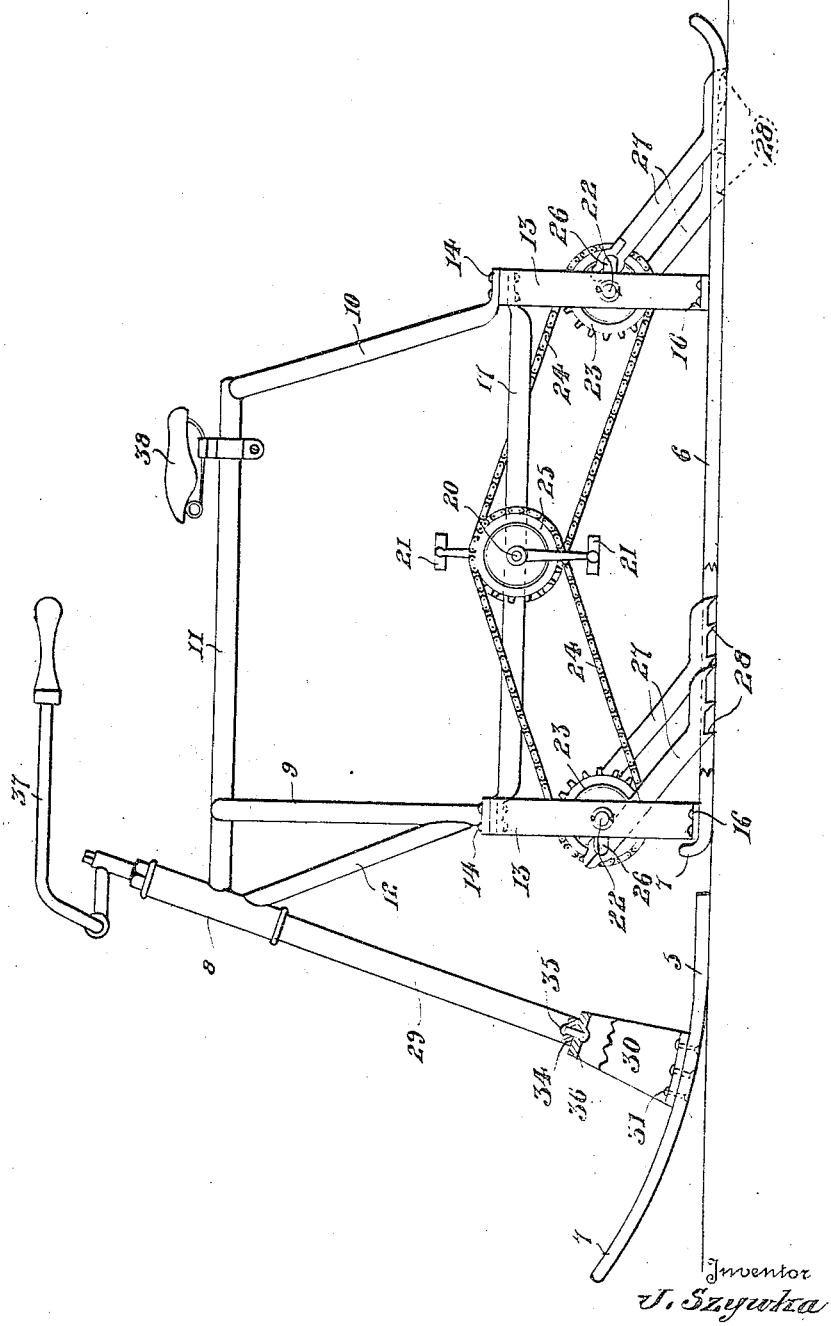

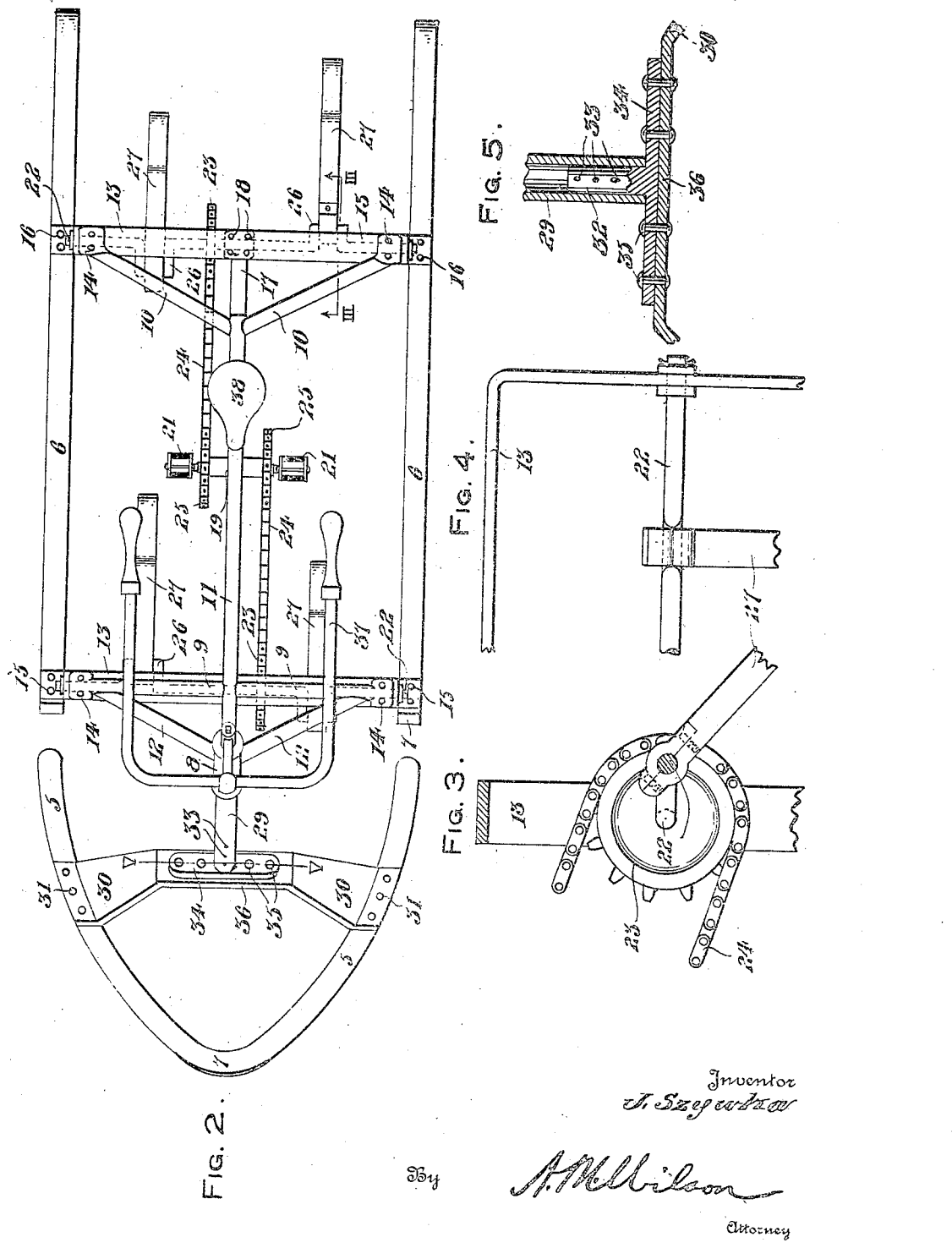

JOHN SZYWKA, OF ALBANY, NEW YORK.

ICE-VELOCIPEDE.

1,379,488.

Specification of Letters Patent.

Patented May 24, 1921.

Application filed September 7, 1920. Serial No. 408,569.

*To all whom it may concern:*

Be it known that I, JOHN SZYWKA, a citizen of Poland, residing at Albany, in the county of Albany and State of New York, have invented certain new and useful Improvements in Ice-Velocipedes, of which the following is a specification.

This invention relates to ice velocipedes, and has for its object to so construct a device of this character that the same may be quickly and effectively propelled across the ice upon little exertion on the part of the operator.

A further object of the invention is to provide a device of this character which is simple in construction, durable, efficient in operation, and capable of being placed into use by an inexperienced person.

With these and other objects in view, the invention consists in certain novel features of construction as hereinafter shown and described and this is specifically pointed out and claimed, and in the drawings illustrative of the preferred embodiment of the invention.

In the drawings,

Figure 1 is a side elevation of the device,

Fig. 2 is a top plan view thereof,

Fig. 3 is a sectional view taken on line III—III of Fig. 2,

Fig. 4 is a fragmentary view on an enlarged scale showing details of the frame and propeller mounting, and Fig. 5 is a fragmentary vertical sectional view taken on the line V—V of Fig. 2 and showing the connection of the guiding runner with the steering head.

Referring more in detail to the drawings, the numeral 5 designates the forward or steering runner and 6 the rear runners, said runners being preferably formed of hardened steel and having their forward ends curved upwardly as at 7 so as to offer as little resistance as possible when being propelled and to readily pass over irregularities of the ice surface. As shown, the forward or front runner 5 is of substantially V-shape with its free ends resting upon the ice at spaced points so as to act in conjunction with the rear runners 6 for maintaining the velocipede upright, the central portion of said forward runner being the part which is upwardly curved as at 7 and as above mentioned.

The frame consists of a steering head 8, a pair of downwardly diverging forward uprights 9, and a similar pair of rear uprights 10, said head and uprights being connected by a top bar 11, and the head 8 being braced to the forward uprights 9 by suitable diverging brace bars 12 arranged diagonally as shown in Fig. 1. The lower ends of the uprights 9 and 10 are flanged and bolted to the horizontal upper portions of inverted U-shaped frame members 13 as at 14, one frame member 13 being bolted at its ends as at 15 to the forward ends of the runners 6, and the other being bolted to said runners 6 as at 16 adjacent the rear ends of said runners 6. A lower horizontal bar 17 connects the frame members 13 and extends longitudinally substantially midway between the runners 6 as shown in Fig. 2, the ends of said lower bar 17 being bolted or riveted as at 18 to the transversely disposed or horizontal portion of the frame members 13. Substantially midway between the ends of the lower bar 17 a bearing 19 is provided, and through this bearing, a crank shaft 20 is passed, said crank shaft being provided with the usual pedals 21.

A horizontally disposed crank shaft 22 is journaled in the legs of each frame member 13, and each crank shaft 22 has a sprocket wheel 23 rigidly secured thereon, an endless sprocket chain 24 passing around each sprocket wheel 23 as well as also around another sprocket wheel 25 rigidly secured upon the crank shaft 20. Each crank shaft 22 is provided with a pair of cranks 26 and each crank has a propeller rod 27 pivoted thereto, the lower ends of the propeller rods 27 being angularly bent and provided with sharpened spurs 28 for engagement with the ice.

Passing through the steering head 8 is a steering post 29, said post having its lower end fastened to a U-shaped bracket 30 which spans the legs of the front runner 5 and has its ends riveted to the latter as at 31. The manner of securing the steering post 29 to the bracket 30 is best illustrated in Fig. 5 wherein a stud 32 is shown telescoped within the lower end of the post 29 and suitably secured in place by riveting or the like as at 33, the stud 32 being carried by a base plate 34 which is riveted as at 35 to the central horizontal portion 36 of the bracket 30. The steering post 29 is provided with the usual handle bars 37, and the top bar 11 supports a seat 38, both of which may be adjusted in the usual manner to accommodate the operator.

To operate the device, the rider operates the pedals 21 so as to cause rotation of sprocket wheels 25 which will impart movement to crank shafts 22 through the gearing described, thereby reciprocating the propelling rods 27 whose spurs 28 intermittently engage the ice so as to propel the velocipede which is guided in any direction by manipulation of the handle bars as in an ordinary wheeled bicycle. As clearly shown in Fig. 2, the cranks of the shafts 22 are staggered so that when the forward propelling rod 27 at one side of the lower bar 17 is operative the rear propelling rod 27 at the other side of bar 17 is also operative, thus securing uniform propulsion.

From the foregoing description, it is believed that the construction and operation as well as the advantages of the present invention will be readily understood and appreciated by those skilled in the art.

Minor changes may be made therein without departing from the spirit and scope of the invention as claimed.

What is claimed as new is:—

1. The combination with a frame including downwardly diverging front and rear pairs of uprights, transversely arranged inverted U-shaped frame members having the lower ends of said uprights rigidly fastened thereto, upper bars connecting said uprights, a lower bar connecting said frame members, a steering head arranged forwardly of the front upright and connected to the latter by means of said upper bar and a pair of downwardly diverging diagonal braces each connected to the lower ends of said front uprights, of a steering post extending through said steering head, a front runner connected to the lower ends of the steering post, spaced rear runners connected to the lower ends of said frame members, and pedal operated means supported by said lower bar and said frame members and including spur carrying propelling rods for propelling the device across ice, said front runner being of substantially V-shaped formation with its intermediate portion forward and upwardly curved and its ends arranged to bear upon the ice at spaced points.

2. The combination with a frame including downwardly diverging front and rear pairs of uprights, transversely arranged inverted U-shaped frame members having the lower ends of said uprights rigidly fastened thereto, upper bars connecting said uprights, a lower bar connecting said frame members, a steering head arranged forwardly of the front upright and connected to the latter by means of said upper bar and a pair of downwardly diverging diagonal braces each connected to the lower ends of said front uprights, of a steering post extending through said steering head, a front runner connected to the lower ends of the steering post, spaced rear runners connected to the lower ends of said frame members, pedal operated means supported by said lower bar and said frame members and including spur carrying propelling rods for propelling the device across ice, said front runner being of substantially V-shaped formation with its intermediate portion forward and upwardly curved and its ends arranged to bear upon the ice at spaced points, the connection between said front runner and the steering post including an inverted U-shaped bracket fastened at its ends to the legs of the front runner and having a horizontal intermediate portion, and a base plate rigidly fastened to the said portion of said bracket and having a rigid stud telescoped within and rigidly fastened to the lower end of said steering post.

3. The combination with a frame including downwardly diverging front and rear pairs of uprights, transversely arranged inverted U-shaped frame members having the lower ends of said uprights rigidly fastened thereto, upper bars connecting said uprights, a lower bar connecting said frame members, a steering head arranged forwardly of the front upright and connected to the latter by means of said upper bar and a pair of downwardly diverging diagonal braces each connected to the lower ends of said front uprights, of a steering post extending through said steering head, a front runner connected to the lower end of the steering post, spaced rear runners connected to the lower ends of said frame members, a crank shaft having a staggered pair of cranks journaled in each of said frame members, a spur carrying propelling rod pivoted on each crank of said crank shafts, a bearing on the lower bar between said crank shafts, a pedal operated crank shaft journaled in said bearing, a pair of sprocket wheels secured on the last named crank shaft, sprocket wheels secured upon each of the first named crank shafts, and a chain passing around the sprocket wheel of each first named crank shaft and around one sprocket wheel of the pedal operated crank shaft whereby rotation of the latter will cause reciprocation of said propelling rods.

In testimony whereof I affix my signature.

JOHN SZYWKA.

Witnesses:
 THADDEUS S. OGONOWSKI,
 ESTELLE KRUDELL.